Sept. 10, 1946.  L. J. MARHOEFER  2,407,563
GLIDER
Filed June 10, 1944
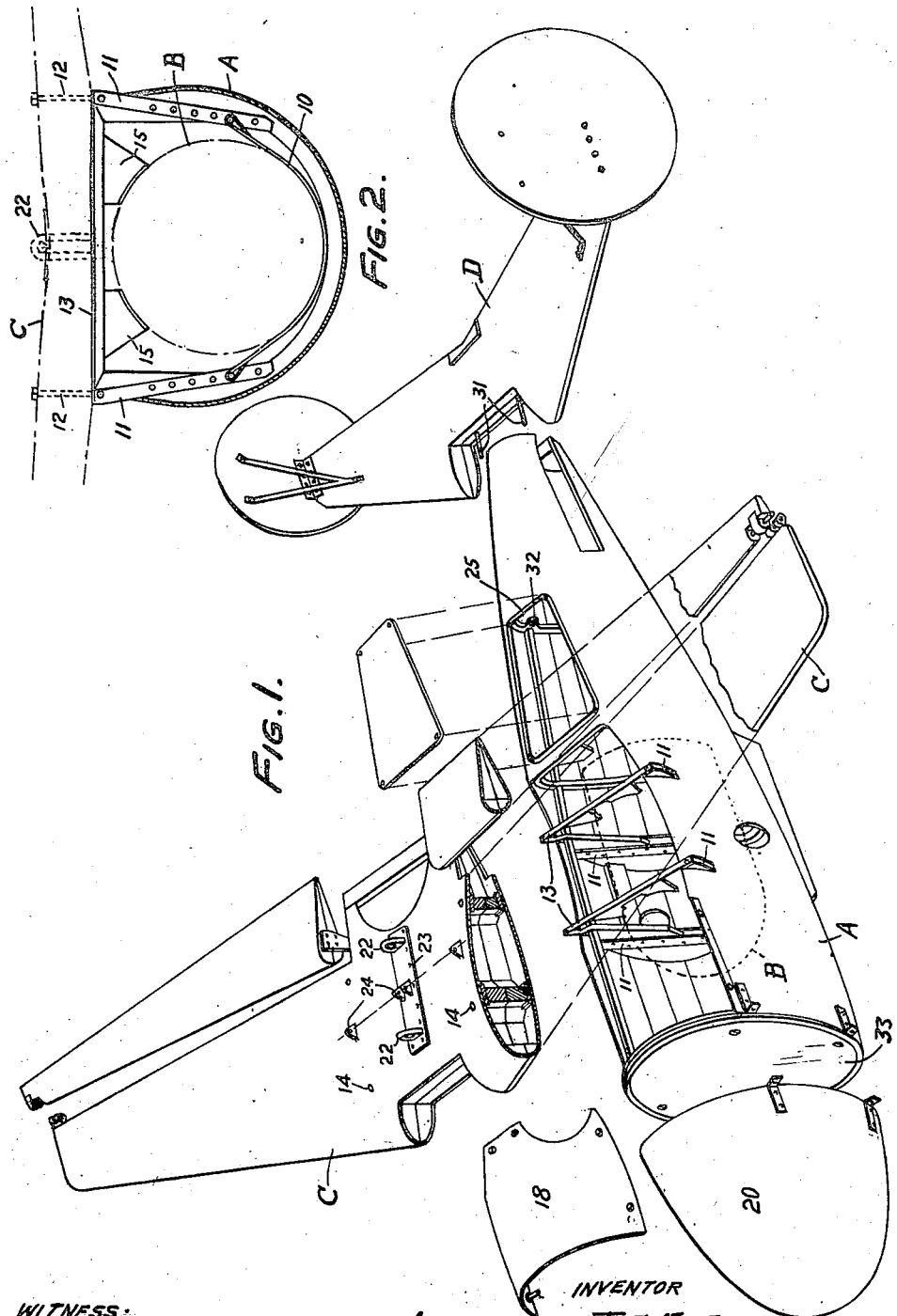
INVENTOR
Laurence J. Marhoefer
BY
Busser and Harding
ATTORNEYS.
WITNESS:
Rob R Mitchel.

Patented Sept. 10, 1946

2,407,563

UNITED STATES PATENT OFFICE 2,407,563

GLIDER

Laurence J. Marhoefer, Haddon Heights, N. J., assignor to Vidal Corporation, Camden, N. J., a corporation of Delaware Application June 10, 1944, Serial No. 539,724

10 Claims. (Cl. 244—16)

The object of my invention is to provide a bomb-holder glider adapted to be carried by an airplane and to be released therefrom while in flight and carry the bomb to its intended target. The bomb-holder embodies the usual elements, namely, the fuselage, the wings, the ailerons and the stabilizer. The invention comprises more particularly the construction of the fuselage including the means whereby the bomb case is inserted thereinto and positioned therein and whereby the bomb, so positioned, is supported by the fuselage and the wing structure.

A preferred embodiment of the invention is shown in the accompanying drawing, in which:

Fig. 1 is a perspective view of the fuselage, the stabilizer and a part of the wing structure before assemblage, and the bomb-holding and bomb-suspension means.

Fig. 2 is a cross-section showing the construction for holding the bomb in the fuselage and for securing the wing to the fuselage and for supporting both from the bomb.

The fuselage A is, preferably, loaded from the top and is therefore shaped to provide a top opening of dimensions suitable to receive the bomb case B. However, a top opening would be provided even if the fuselage were loaded from the bottom. In the embodiment of the invention shown in the drawings, the bomb case is lowered into place in a cradle comprising bomb-supporting straps 10 which at their ends are secured to slings 11, formed of flat band iron, which are secured to the fuselage and extend upward through its wall just below its top opening. Slings on opposite sides of the fuselage are connected at their tops by batten bars 13. Bolts 12 extend through eyes in the ends of the batten bars and through orifices 14 in the wing structure C. The batten bars are provided with chock blocks 15, which contact the bomb case and insure a tight fit between it and the fuselage to prevent movement therein.

The wing structure is made in two halves—upper and lower—suitably secured together and is placed over the fuselage so that its central part closes the main part of the top opening in the fuselage, the orifices 14 in the wing structure then aligning with the holes in the batten bars 13. The front of the top opening in the fuselage is closed by the plate 18.

The batten bars 13 are not applied until after the bomb case is inserted into the fuselage, after which they are secured to the slings 11 by means of the bolts 12, the bolts extending through holes in the slings 11 and bars 13 and through the orifices 14 in the wing structure; thereby securing together the fuselage, bomb and bomb cradle and wing structure, besides tightening the bomb chocks around the bomb.

Secured to the front of the fuselage is a removable nose-piece or fairing 20 and bulkhead 33. All control mechanism may be mounted on the bulkhead 33 before assemblage.

Secured to the top and bottom of the wing structure are reinforcing plates 23. Hangers 22, whose lower ends are secured to ears 21 on the bomb case, extend through the wing structure and plates 23 and are secured to these plates. The hangers are suspended from the airplane (not shown) by any suitable means.

Secured to the wing structure are a series of hoisting lugs 24, which are adapted to be engaged by other suspension means (not shown) carried by the airplane.

To the rear of the bomb-receiving top opening in the fuselage is a supplemental top opening adapted to be closed by a hatch 25. This opening allows access to the rear of the fuselage, which is utilized for storage of equipment, as, for example, to store batteries for power supply.

The trailing end of the fuselage A is slotted to receive the stabilizer D. The stabilizer is so recessed that, when applied to the fuselage, the side walls of the recess engage the outer wall of the fuselage forward of its slotted portion. Bolts 31 projecting from the base of the stabilizer recess extend through holes in lugs 32 on an internal rib of the fuselage.

What I claim and desire to protect by Letters Patent is:

1. A bomb glider adapted to be carried by an airplane and to be released therefrom while in flight, comprising a fuselage having a top opening, a bomb cradle extending within and secured to the fuselage, means carried by the cradle adapted to hold the bomb within the fuselage, a wing structure the central part of which extends over the top opening of the fuselage, and means extending through the wing structure and secured to the cradle to thereby securely connect the wing structure with the fuselage, whereby the bomb, fuselage and wing structure are supportable as a unit from the airplane.

2. A bomb glider comprising wing structure and a fuselage having a top opening; a bomb-cradle comprising straps on which the bomb is adapted to rest, slings secured to the fuselage and to which the opposite ends of the straps are secured and cross-bars connecting opposite upper ends of the slings; and means extending through the wing structure and secured to the cradle to thereby securely connect the wing structure with the fuselage.

3. A bomb-glider as defined in claim 2 comprising also blocks carried by the cradle and adapted to hold the bomb in fixed relation with the fuselage.

4. A bomb-glider as defined in claim 2 comprising also blocks secured to said cross-bars and adapted to hold the bomb in fixed relation with the fuselage.

5. A bomb-glider as defined in claim 1 and comprising also a separate nose-piece attached to the forward end of the fuselage.

6. A bomb-glider as defined in claim 1 in which the wing structure is of a width adapted to cover the entire top opening except the forward part thereof, a separate plate covering the forward part of the opening.

7. A bomb-glider as defined in claim 1 and comprising also a transversely extending reinforcing plate secured centrally to the top of the wing structure and through which the bomb-glider suspension means are adapted to extend.

8. A bomb-glider as defined in claim 1 in which the fuselage is provided with a separate opening rearwardly of the top opening specified in claim 1, and a plate adapted to cover said opening.

9. A bomb glider as defined in claim 1 in which a series of hoisting lugs are secured to the upper face of the central part of the wing structure.

10. A bomb glider as defined in claim 1 in which bomb-supporting hangers, adapted to be suspended from an airplane, extend through the wing structure.

LAURENCE J. MARHOEFER.